(12) United States Patent
Reiter et al.

(10) Patent No.: US 8,101,049 B2
(45) Date of Patent: Jan. 24, 2012

(54) METHOD FOR PRODUCING LOW COST MEDIA

(75) Inventors: Jeffrey Shane Reiter, Palo Alto, CA (US); Steven Eric Barlow, Hayward, CA (US); Matthew James Cross, Dublin, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 613 days.

(21) Appl. No.: 12/260,934

(22) Filed: Oct. 29, 2008

(65) Prior Publication Data

US 2010/0101938 A1 Apr. 29, 2010

(51) Int. Cl.
*C23C 14/58* (2006.01)
*C23C 14/34* (2006.01)

(52) U.S. Cl. ............ 204/192.2; 204/192.1; 204/192.11; 204/192.12; 204/192.15; 204/298.01; 204/298.04; 204/298.12; 204/298.13; 204/298.15; 204/298.16; 204/298.23; 204/298.24; 204/298.25; 204/298.26; 427/128; 427/129

(58) Field of Classification Search ............... 204/192.1, 204/192.2, 192.15, 192.12, 192.11, 298.01, 204/298.12, 298.13, 298.16, 298.04, 298.23, 204/298.24, 298.25, 298.26, 298.15; 427/128, 427/129

See application file for complete search history.

(56) References Cited

U.S. PATENT DOCUMENTS

| 4,681,004 | A | | 7/1987 | Waldner |
| 6,113,753 | A | * | 9/2000 | Washburn ............... 204/192.15 |
| 7,060,377 | B2 | | 6/2006 | Liu et al. |

* cited by examiner

*Primary Examiner* — Christopher Young
(74) *Attorney, Agent, or Firm* — Foley & Lardner LLP

(57) ABSTRACT

Disclosed is a method for the low cost manufacturing a plurality of rigid sputtered magnetic media disks of one or more sizes from a rigid sheet, in which one or more initial steps of preparing the media are performed while the media is in sheet form. The individual disks are then removed from the sheet, and final processing is performed individually on the disks.

20 Claims, 6 Drawing Sheets

Figure 1. Schematic View of a Magnetic Disk Drive (related art).

Figure 2. Schematic Representation of the Film Structure in Accordance With a Magnetic Recording Medium of the Related Art.

Figure 4. Manufacturing Process as a Sheet

Figure 5. Example of Multiple Disk Sizes from a Single Sheet
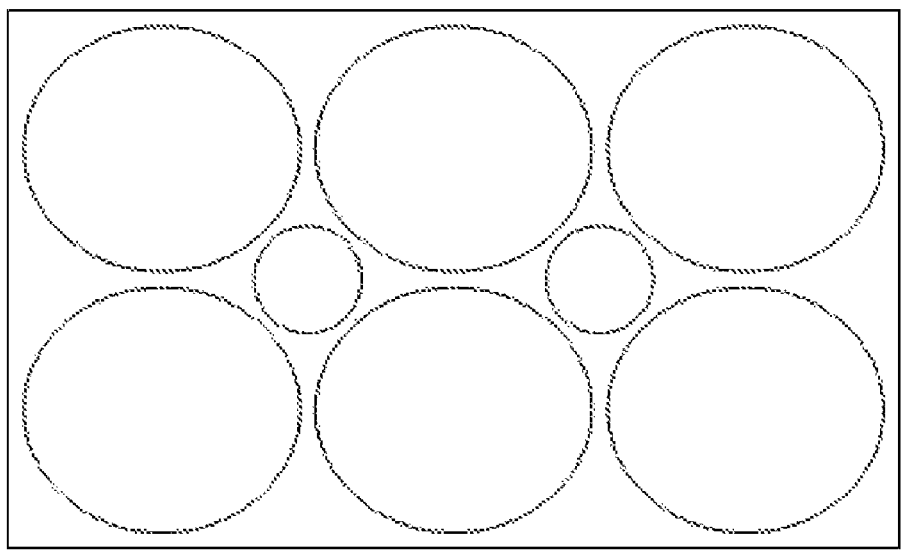

METHOD FOR PRODUCING LOW COST MEDIA

RELATED APPLICATIONS

None.

BACKGROUND

Disclosed is a method for the low cost manufacturing a plurality of rigid sputtered magnetic media disks of one or more sizes from a rigid sheet, in which one or more initial steps of preparing the media are performed while the media is in sheet form. The individual disks are then removed from the sheet, and final processing is performed individually on the disks.

SUMMARY

The present invention is a method for the low cost manufacturing of sputtered magnetic media disks, in which the media is initially formed as a sheet larger than the size of a disk, and one or more initial steps of preparing the media are performed while the media is in sheet form. The individual disks are then removed from the sheet, and final processing is performed individually on the disks.

BRIEF DESCRIPTION OF THE DRAWINGS

FIG. 5 shows an example of multiple sizes of disks available from a single sheet.

DETAILED DESCRIPTION

Figure 1:
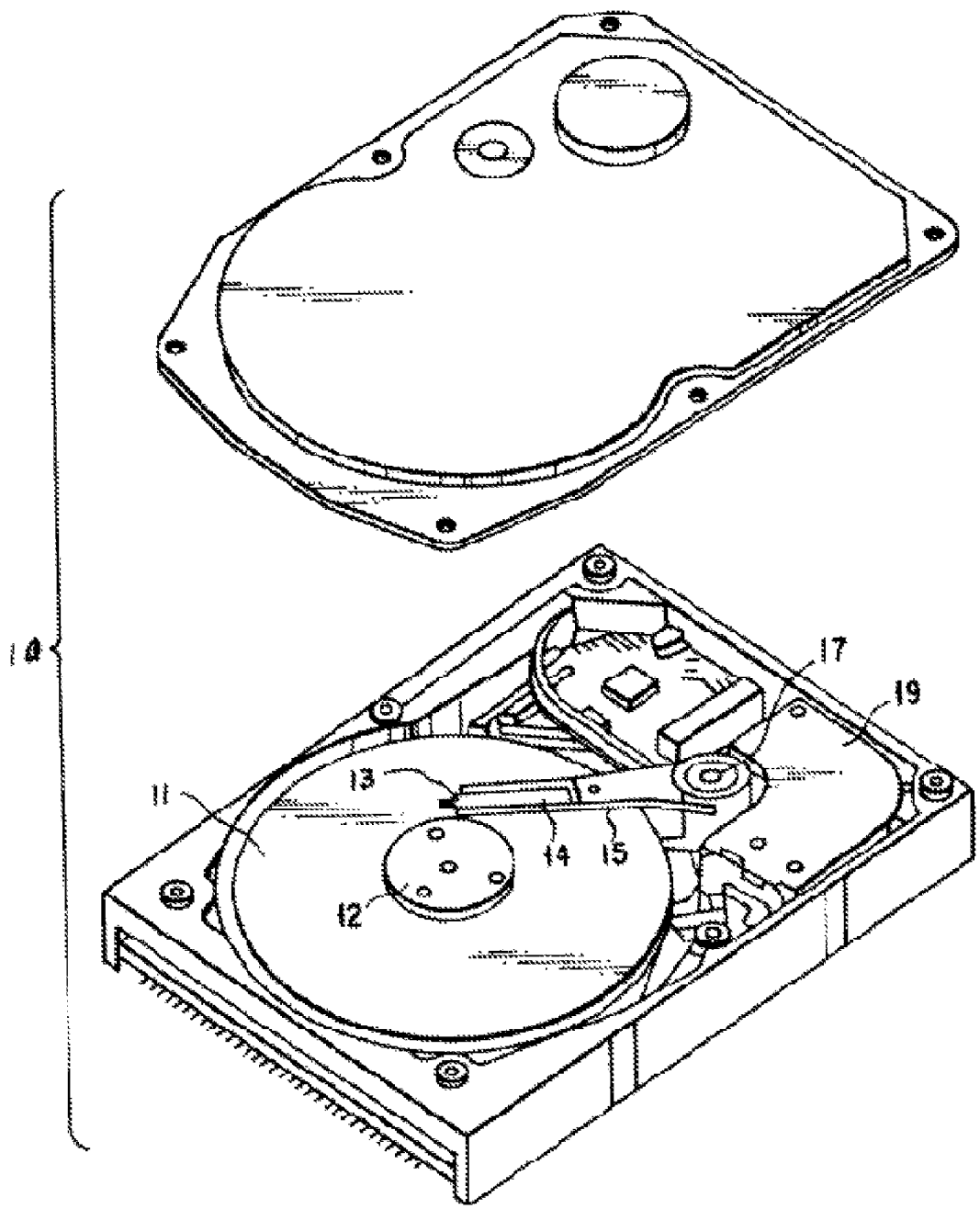
FIG. 1 is a view of a magnetic disk drive of the related art.

This invention relates to perpendicular recording media, such as thin film magnetic recording disks having perpendicular recording, and to a method of manufacturing the media. The invention has particular applicability to high areal density magnetic recording media exhibiting low noise.

The increasing demands for higher areal recording density impose increasingly greater demands on thin film magnetic recording media in terms of remnant coercivity (Hr), magnetic remanence (Mr), coercivity squareness (S*), medium noise, i.e., signal-to-medium noise ratio (SMNR), and narrow track recording performance. It is extremely difficult to produce a magnetic recording medium satisfying such demanding requirements.

The linear recording density can be increased by increasing the Hr of the magnetic recording medium, and by decreasing the medium noise, as by maintaining very fine magnetically non-coupled grains. Medium noise in thin films is a dominant factor restricting increased recording density of high-density magnetic hard disk drives, and is attributed primarily to inhomogeneous grain size and intergranular exchange coupling. Accordingly, in order to increase linear density, medium noise must be minimized by suitable microstructure control.

According to the domain theory, a magnetic material is composed of a number of submicroscopic regions called domains. Each domain contains parallel atomic moments and is always magnetized to saturation, but the directions of magnetization of different domains are not necessarily parallel. In the absence of an applied magnetic field, adjacent domains may be oriented randomly in any number of several directions, called the directions of easy magnetization, which depend on the geometry of the crystal. The resultant effect of all these various directions of magnetization may be zero, as is the case with an unmagnetized specimen. When a magnetic filed is applied, the domains most nearly parallel to the direction of the applied field grow in size at the expense of the others. This is called boundary displacement of the domains or the domain growth. A further increase in magnetic field causes more domains to rotate and align parallel to the applied field. When the material reaches the point of saturation magnetization, no further domain growth would take place on increasing the strength of the magnetic field.

A magnetic material is said to possess a uniaxial anisotropy when all domains are oriented in the same direction in the material. On the other extreme, a magnetic material is said to be isotropic when all domains are oriented randomly.

The ease of magnetization or demagnetization of a magnetic material depends on the crystal structure, grain orientation, the state of strain, and the direction and strength of the magnetic field. The magnetization is most easily obtained along the easy axis of magnetization but most difficult along the hard axis of magnetization.

"Anisotropy energy" is the difference in energy of magnetization for these two extreme directions, namely, the easy axis of magnetization and the hard axis of magnetization. For example, a single crystal of iron, which is made up of a cubic array of iron atoms, tends to magnetize in the directions of the cube edges along which lie the easy axes of magnetization. A single crystal of iron requires about $1.4 \times 10^5$ ergs/cm$^3$ (at room temperature) to move magnetization into the hard axis of magnetization, which is along a cubic body diagonal.

The anisotropy energy $U_A$ could be expressed in an ascending power series of the direction cosines between the magnetization and the crystal axes. For cubic crystals, the lowest-order terms take the form of Equation (1), $$U_A = K_1(\alpha_1^2\alpha_2^2 + \alpha_2^2\alpha_3^2 + \alpha_3^2\alpha_1^2) + K_2(\alpha_1^2\alpha_2^2\alpha_3^2) \tag{1}$$

where $\alpha_1$, $\alpha_2$ and $\alpha_3$ are direction cosines with respect to the cube, and $K_1$ and $K_2$ are temperature-dependent parameters characteristic of the material, called anisotropy constants.

Anisotropy constants can be determined from (1) analysis of magnetization curves, (2) the torque on single crystals in a large applied field, and (3) single crystal magnetic resonance.

The total energy of a magnetic substance depends upon the state of strain in the magnetic material and the direction of magnetization through three contributions. The first two consist of the crystalline anisotropy energy of the unstrained lattice plus a correction that takes into account the dependence of the anisotropy energy on the state of strain. The third contribution is that of the elastic energy, which is independent of magnetization direction and is a minimum in the unstrained state. The state of strain of the crystal will be that which makes the sum of the three contributions of the energy a minimum. The result is that, when magnetized, the lattice is always distorted from the unstrained state, unless there is no anisotropy.

"Magnetostriction" refers to the changes in dimension of a magnetic material when it is placed in magnetic field. It is caused by the rotation of domains of a magnetic material under the action of magnetic field. The rotation of domains gives rise to internal strains in the material, causing its contraction or expansion.

The requirements for high areal density impose increasingly greater requirements on magnetic recording media in terms of coercivity, remnant squareness, low medium noise and narrow track recording performance. It is extremely difficult to produce a magnetic recording medium satisfying such demanding requirements, particularly a high-density magnetic rigid disk medium for longitudinal and perpendicular recording. The magnetic anisotropy of longitudinal and perpendicular recording media makes the easily magnetized direction of the media located in the film plane and perpendicular to the film plane, respectively. The remnant magnetic moment of the magnetic media after magnetic recording or writing of longitudinal and perpendicular media is located in the film plane and perpendicular to the film plane, respectively.

A substrate material conventionally employed in producing magnetic recording rigid disks comprises an aluminum-magnesium (Al—Mg) alloy. Such Al—Mg alloys are typically electrolessly plated with a layer of NiP at a thickness of about 15 microns to increase the hardness of the substrates, thereby providing a suitable surface for polishing to provide the requisite surface roughness or texture.

Other substrate materials have been employed, such as glass, e.g., an amorphous glass, glass-ceramic material which comprises a mixture of amorphous and crystalline materials, and ceramic materials. Glass-ceramic materials do not normally exhibit a crystalline surface. Glasses and glass-ceramics generally exhibit high resistance to shocks. A plastic material of suitable rigidity may also be used for the substrate material.

Almost all the manufacturing of a disk media takes place in clean rooms where the amount of dust in the atmosphere is kept very low, and is strictly controlled and monitored. After one or more cleaning processes on a non-magnetic substrate, the substrate has an ultra-clean surface and is ready for the deposition of layers of magnetic media on the substrate. The apparatus for depositing all the layers needed for such media could be a static sputter system or a pass-by system, where all the layers except the lubricant are deposited sequentially inside a suitable vacuum environment.

Figure 2:
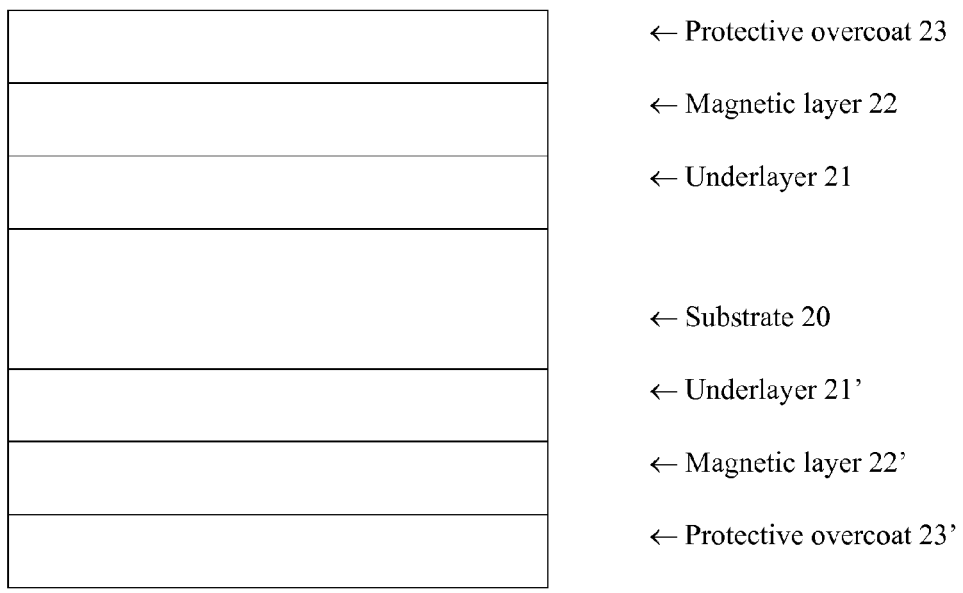
FIG. 2 is a schematic representation of the film structure in accordance with a magnetic recording medium of the related art.

A cross sectional view of a conventional longitudinal recording disk medium is depicted in FIG. 2. A longitudinal recording medium typically comprises a non-magnetic substrate 20 having sequentially deposited on each side thereof an underlayer 21, 21', such as chromium (Cr) or Cr-alloy, a magnetic layer 22, 22', typically comprising a cobalt (Co)-base alloy, and a protective overcoat 23, 23', typically containing carbon. Conventional practices also comprise bonding a lubricant topcoat (not shown) to the protective overcoat. Underlayer 21, 21', magnetic layer 22, 22', and protective overcoat 23, 23', are typically deposited by sputtering techniques. The Co-base alloy magnetic layer deposited by conventional techniques normally comprises polycrystallites epitaxially grown on the polycrystal Cr or Cr-alloy underlayer.

Figure 3:
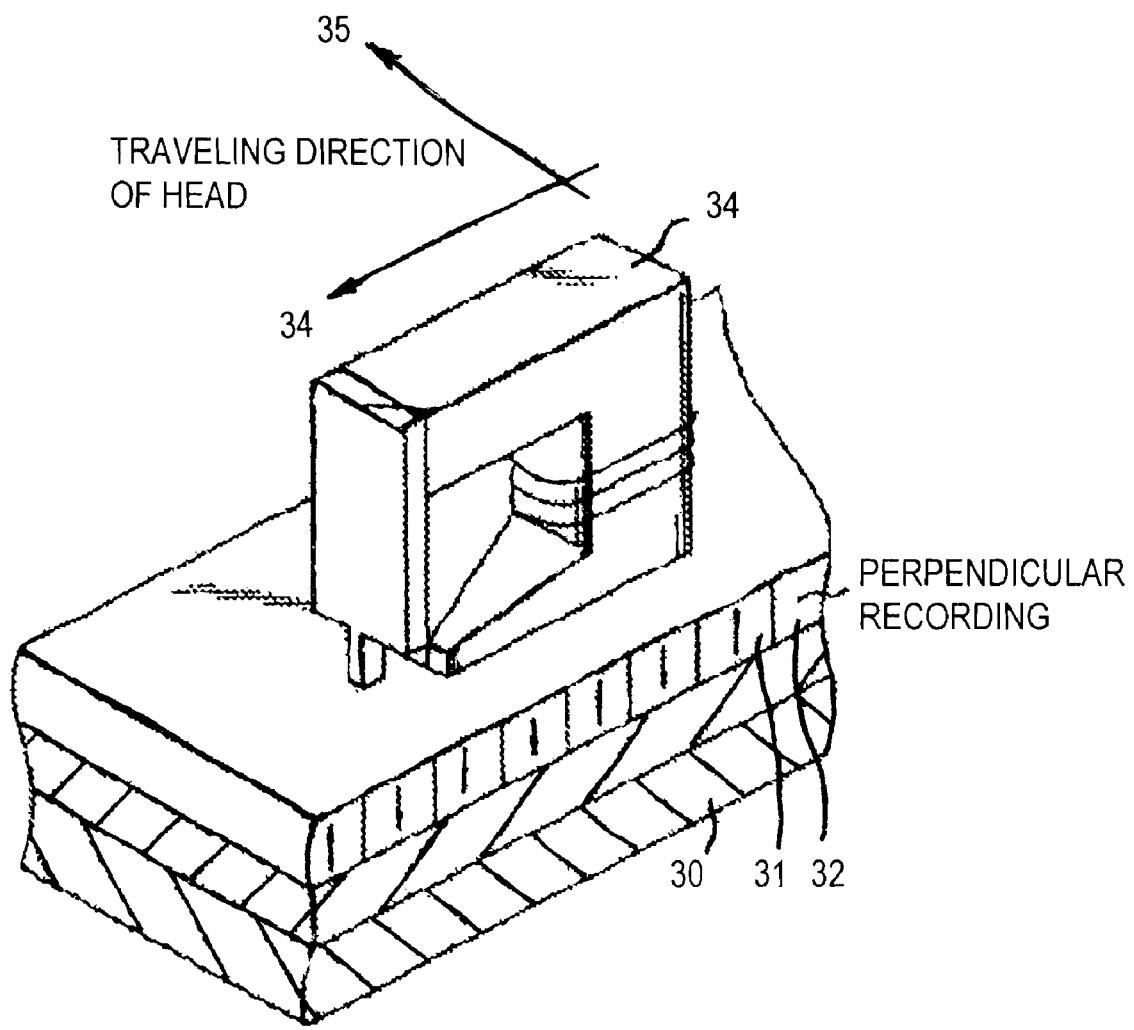
FIG. 3 is perspective view of a magnetic head and a magnetic disk of the related art.

A conventional perpendicular recording disk medium, shown in FIG. 3, is similar to the longitudinal recording medium depicted in FIG. 2, but with the following differences. First, a conventional perpendicular recording disk medium has soft magnetic underlayer 31 of an alloy such as Permalloy instead of a Cr-containing underlayer. Second, as shown in FIG. 3, magnetic layer 32 of the perpendicular recording disk medium comprises domains oriented in a direction perpendicular to the plane of the substrate 30. Also, shown in FIG. 3 are the following: (a) read-write head 33 located on the recording medium, (b) traveling direction 34 of head 33 and (c) transverse direction 35 with respect to the traveling direction 34.

The underlayer and magnetic layer are conventionally sequentially sputter deposited on the substrate in an inert gas atmosphere, such as an atmosphere of pure argon. A conventional carbon overcoat is typically deposited in argon with nitrogen, hydrogen or ethylene. Conventional lubricant topcoats are typically about 20 Å thick.

It is recognized that the magnetic properties, such as Hr, Mr, S* and SMNR, which are critical to the performance of a magnetic alloy film, depend primarily upon the microstructure of the magnetic layer which, in turn, is influenced by one or more underlying layers on which it is deposited. It is also recognized that an underlayer made of soft magnetic films is useful in perpendicular recording media because a relatively thick (compared to magnetic layer) soft underlayer provides a return path for the read-write head and amplifies perpendicular component of the write field in the recording layer. However, Barkhausen noise caused by domain wall motions in the soft underlayer can be a significant noise source. Since the orientation of the domains can be controlled by the uniaxial anisotropy, introducing a uniaxial anisotropy in the soft underlayer would be one way to suppress Barkhausen noise. When the uniaxial anisotropy is sufficiently large, the domains would preferably orient themselves along the anisotropy axis.

The uniaxial anisotropy could be controlled in several ways in the soft magnetic thin film materials. The most frequently applied methods are post-deposition annealing while applying a magnetic field and applying a bias magnetic field during deposition. However, both methods can cause complications in the disk manufacturing process.

A "soft magnetic" material is material that is easily magnetized and demagnetized. As compared to a soft magnetic material, a "hard magnetic" material is one that neither magnetizes nor demagnetizes easily. The problem of making soft magnetic materials conventionally is that they usually have many crystalline boundaries and crystal grains oriented in many directions. In such metals, the magnetization process is accompanied by much irreversible Block wall motion and by much rotation against anisotropy, which is usually irreversible. The preferred soft material would be a material fabricated by some inexpensive technique that results in all crystal grains being oriented in the same or nearly the same direction. However, "all grains" oriented in the same direction would be very difficult to produce and would not be the "preferred soft material." In fact, very high anisotropy is not desirable.

The magnetic layer of modern magnetic media is composed of a single sheet of very fine, single domain grains. The grain structure inherits randomness from the manufacturing process, that is, the grains neither grow in a regular pattern nor do they have identical sizes. Traditional magnetic recording deals with this randomness by averaging. Scaling has made possible dramatic increases of the areal density in magnetic recording. However, very small grains are no longer thermally stable and the maximum obtainable recording density is limited.

The cleaning/polishing methods and the cleaning/polishing means that can employed on conventional disks are any one or more of the methods shown below.

Mechanical Polishing

Persons skilled in this art would recognize that the variables that control mechanical polishing are:

(1) substrate surface initial condition: roughness, waviness, substrate size, substrate shape and grain size;

(2) polishing slurry size ($Al_2O_3$, $CeO_2$, $SiO_2$, etc) and coolant (inorganic and organic solutions with lubricant);

(3) polishing time and surface finishing; and (4) washing and cleaning substrate surface Chemical Polishing Persons skilled in this art would recognize that the variables that control chemical polishing are:

(1) substrate surface initial condition: roughness, waviness, substrate size, substrate shape and grain size;

(2) polishing solutions compositions and their ability to dissolve the substrate materials;

(3) the composition consists of a combination of different acids (e.g. nitric, sulfuric, hydrochloric, phosphoric, chromic, acetic) or organic solutions (e.g. methanol, glycerin, ethyldiglicol), also containing some added electropositive ions. E.g., polishing of Al: small amounts of Cu will create additional local cathodes by deposition on Al, stimulating the polishing process. Adding some oxidants has a function as depolarization agents.

Electrochemical Polishing

Persons skilled in this art would recognize that the variables that control electrochemical polishing are:

(1) The external source of electricity to produce the anodic current density and voltage;

(2) the electrolyte temperature;

(3) the time duration of electropolishing;

(4) the cathodic materials; in general, the cathode surface should be many times larger than that of electropolished substrate. Different materials are used as cathodes depending on the applied electrolyte; and (5) agitation, which can eliminates the undesired concentration of the dissolved material at the substrate. Agitation can improve the supply of fresh electropolishing electrolyte to substrate surface. Agitation can prevent local heating and release gas bubbles from the polished surface to avoid pitting on the substrate surface.

CMP (Chemical Mechanical Polishing) used in semiconductor wafer polishing. Persons skilled in this art would recognize the variables that control the CMP process.

A method for forming die cut non-sputtered magnetic recording disks from a flexible sheet material is described in U.S. Pat. No. 4,681,004. However, a method as described herein for forming sputtered magnetic recording disks from a rigid sheet material is unknown in the prior art to the best of Applicant's knowledge. A rigid sheet material, as used in this invention, is a material in which the unsupported weight of the sheet does not cause significant deformation of the sheet over the linear dimensions of the recording disks that will be cut from it. A significant deformation is one in which the deformation exceeds operating tolerances for deformation, surface uniformity, head clearances, or the like, when the material cut from the disk is used as a magnetic recording disk.

In the present invention, the substrate material is formed into sheets having a surface area dimension larger than a single disk, and having a shape suitable to encompass at least a single disk. Various fabrication steps as described below are performed as a sheet, before the individual disks are formed from the sheet.

The sheet of substrate material is first polished. Polishing provides a desired degree of surface smoothness, particularly the degree of smoothness necessary to satisfy the high areal recording density objectives of current magnetic recording media. A solvent may be used in polishing the sheet. Surface roughness defects known as bumps, or asperities as the technical term goes, are removed by the polishing. An objective of the polishing to produce as flat a surface as possible. The cleaning and polishing typically includes both the chemical and mechanical methods described above.

The sheet of substrate material is then processed by cleaning the sheet, which involves the removal of particulates, organic contaminants, and inorganic contaminants. The organic contaminants may arise from environmental conditions or the process of polishing the sheet. Cleaning involves the use of binders solvents, which are used as suspension for abrasives, to remove the contaminants. The binder solvents used in cleaning, in particular the suspended abrasives, can introduce other asperities through particulates and other contaminants left behind on the sheet. These contaminants are removed by the later steps of buffing & burnishing.

The steps of mechanically polishing and cleaning both require relative motion between the sheet being processed and the polishing head or cleaning head. Any combinations of the motions described in the various embodiments may also be used to process the substrate sheet.

In one embodiment of the present invention, this motion may accomplished by moving the sheet relative to the polishing head or cleaning head.

Another embodiment is to provide the motion by moving the polishing head or cleaning head relative to the sheet. The polishing head or cleaning head may operate with a motion in the plane parallel to the surface of the sheet.

In another embodiment, the polishing head or cleaning head may have a cylindrical shape with a rotating motion, where the axis of rotation of the cylinder is parallel to the plane of the sheet, allowing the side of the polishing head or cleaning head to make contact with the sheet.

In another embodiment, the axis of rotation of the cylindrical polishing head or cleaning head is perpendicular to the surface of the sheet, allowing the end of the cylindrical polishing head or cleaning head is used to make contact with the sheet and thereby polish or clean the sheet.

Figure 4A:
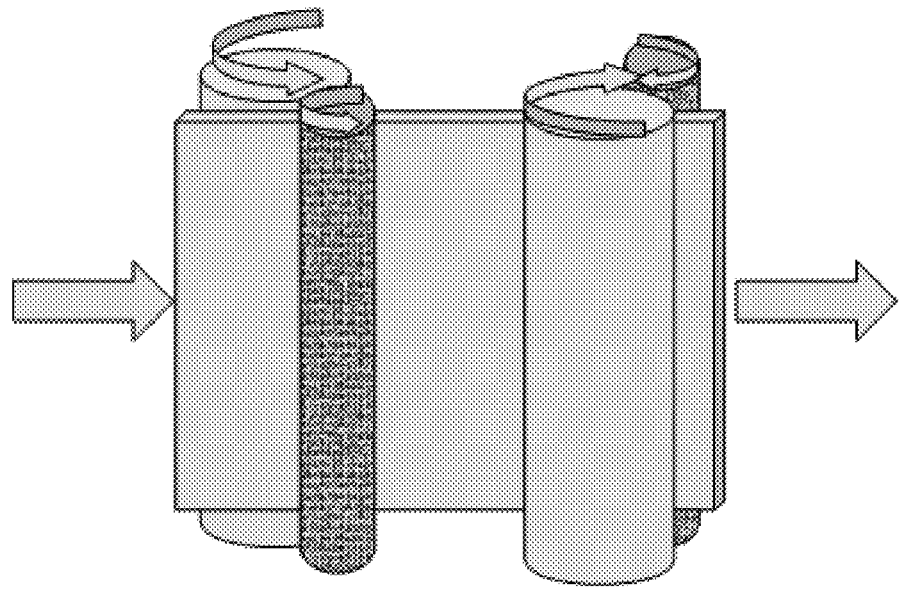
FIG. 4 (A to C) is a diagram of an exemplary method of processing a rigid sheet of sputtered magnetic material.
Figure 4B:
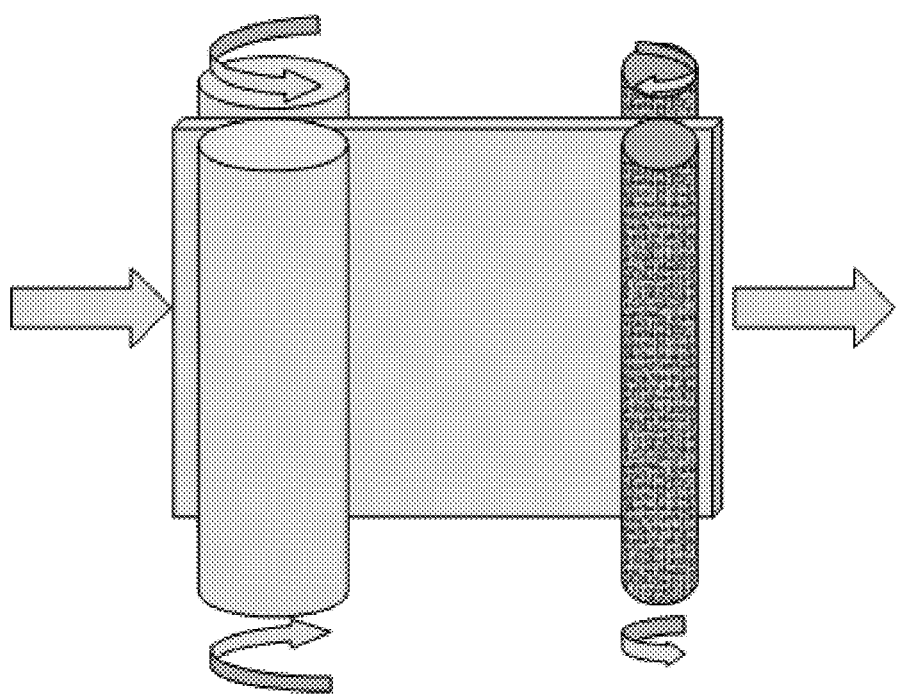
Figure 4C:
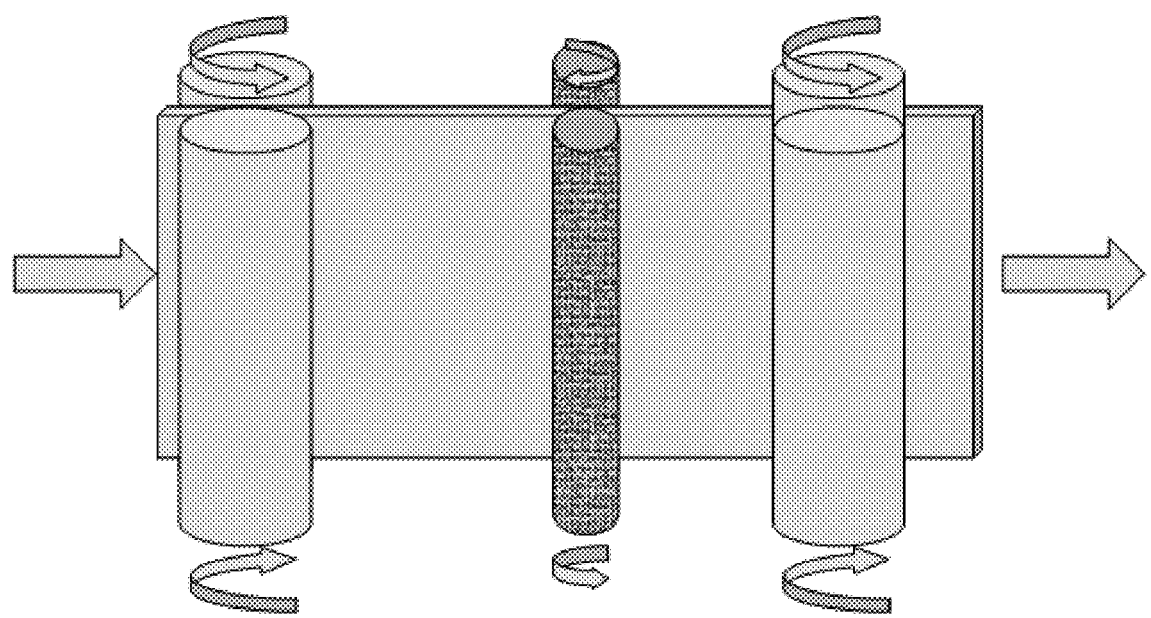

In another embodiment, separate sets of rollers are used to move the sheet material and to perform the actual polishing or cleaning, as shown in FIGS. 4A-4C. A first set of rollers known as nip rollers moves the entire sheet at a predetermined speed. A second set of rollers known as the processing rollers are in contact with the sheet, and perform the cleaning or polishing processes by providing relative motion between the sheet moved by the nip rollers and the processing rollers. This results in improved surface abrasion, because the two sets of rollers can be independently controlled. The sheet may be moved in the opposite direction by reversing the direction of rotation of the rollers, and additional processing may optionally be performed either as the sheet is moving in the opposite direction, or after the sheet has been moved in the reverse direction and as the sheet is moved again in the forward direction through the rollers.

One set of nip rollers may be used as shown in FIGS. 4A, 4B for sheet material of sufficient stiffness. If the sheet material is not sufficiently stiff, more than one set of nip rollers may be used as shown in FIG. 4C. If the nip rollers provide more traction than the processing rollers, then the configuration of FIG. 4A may be used regardless of the material stiffness or direction of travel.

It is readily apparent that because the function of the nip rollers is to move the sheet, the nip rollers do not need to span the entire width of the sheet. The nip rollers may span a portion of the sheet, or may be made up of a plurality of coaxial sub-rollers on each side of the sheet, or may be made up of wheels. It is also readily apparent that if it is desired to process only one side of the sheet, then only the side to be processed will require one or more processing rollers.

The substrate material is next processed as a sheet by depositing a required minimum thickness of sputtered magnetic material over at least a portion of the sheet, the portion being large enough to encompass at least a single disk. The sputtering is performed in a vacuum. Certain predetermined portions of the sheet optionally may not have a required thickness of material deposited on those portions of the sheet, as long as those portions of the sheet are not later used as part of disks requiring at least the minimum thickness of material.

Sputtering leads to some particulates formation on the post sputter disks. These particulates need to be removed to ensure that they do not lead to the scratching between the head and substrate. Thus, a lubrication is preferably applied to the substrate surface as one of the top layers on the substrate. For conventional single-disk sputtered magnetic media in the prior art, this process is representatively described in U.S. Pat. No. 7,060,377.

Optionally, but preferentially, the sheet is processed by the buffing stage, during which removal of any remaining asperities is performed on at least a portion of the surface area of the sheet, the portion having a surface area dimension larger than a single disk, and having a shape suitable to encompass at least a single disk. The buffing can be performed before a single application of lubrication. Alternatively, buffing may be performed after a first application of lubrication, and before a degrease step and a relubrication step. If a two-step lubrication process is used, a layer of lubricant additives is coated on a carbon overcoat by dip-lubing or vapor-lubing, following by ultraviolet radiation to achieve certain bonding. Excess additives are removed by either a vapor degrease or a solvent wash. A second step dip-lubing then coats lubricant on medium to the desirable thickness.

Preferentially, the entire surface area of the sheet is buffed in order to minimize the amount of unusable sheet material. As with polishing, there is relative motion between the buffing head and the sheet, and this motion may be provided by using the methods described above for the polishing or cleaning steps. However, the process of buffing as a sheet may introduce edge effects, wherein the portion of the sheet in contact with the nip roller has not been buffed to the required level. Any such areas of the sheet cannot be used for the data storage portion of a magnetic disk produced by the process of the present invention. Preferentially during polishing, there is relative motion between the sheet and the buffing apparatus. Buffing improves the quality of the media surface prior to pre-sputter cleaning. After buffing, the substrate is wiped and a clean lube is evenly applied on the surface.

The sheet may optionally, but preferentially, be further processed by burnishing at least a portion of the surface area of the sheet, the portion having a surface area dimension larger than a single disk, and having a shape suitable to encompass at least a single disk. The step of burnishing corrects for manufacturing defects as they pertain to the electrical performance of the disks after they are cut from the sheet. The process of burnishing includes passing a burnishing head over the surface of the sheet, removing any bumps (asperities as the technical term goes). A glide head then goes over the sheet, checking for remaining bumps, if any. Finally a certifying head measures the magnetic recording ability of the substrate. The certifying head assures electrical performance—any manufacturing defects would show up in certifying tests, or problems in sputtering. The certifying test may also check other performance and physical parameters other than manufacturing defects. Motion between the sheet and either the burnishing head or the glide head may be accomplished by any of the methods described earlier to describe how the sheet is polished or cleaned.

The sheet is further processed by depositing a lubricant layer on the surface. The deposition is preferentially performed by dipping the sheet into a bath of lubricant, removing the sheet from the bath, and causing excess lubricant to accumulate toward at least a portion of the edges of the sheet, for instance a corner. Excess lubrication accumulating at the edge is known as an edge effect, and it is desirable to minimize the amount of magnetic media affected by edge effects, and to avoid using the portions of magnetic media affected by edge effects. An advantage of lubricating as a sheet rather than lubricating individual disks is that the edge effects on the sheet are ordinarily away from the locations where the individual disks will be cut from the sheet.

The accumulation of lubricant may be facilitated by methods such as but not limited to wiping, gravity, gas pressure, or inertial forces caused by moving the sheet. Any other methods to deposit lubricants onto a sheet which are used for processing individual disks may be adapted to operate on an entire sheet. A thinner the layer of lubricant material provides lower loss between head and media, limited by performance issues.

Magnetic testing of the media can be efficiently performed as sheets. These tests include magnetic disparities and performance issues such as the presence of voids, which are caused by particulates in the surface which shadow and later removed as an asperity). Magnetic testing may also be performed to detect dropout voids, dropout voids being areas which were shadowed from having sputtered being deposited at that area. Dropout areas are usually caused by the presence of a particle contaminant on the surface of the sheet as the sheet is being sputtered. Fly effects will be an important item to test—the media must be tested under conditions that simulate actual use, in particular the speed of travel of the magnetic medium under test with respect to the test head. Such tests, also known as glide tests, must test 100% of the portion of the sheet from which disks will be cut. Flexible disks such as mylar film may be tested by mounting the sheets on a cylinder which rotates past a test head. For rigid sheets, i.e., sheets which exhibit negligible bending on the scale of an individual disk when subject to ordinary gravity forces but which may exhibit a limited amount of bending on the scale of the entire sheet when subject to that same level of force, such sheets also may be mounted on a rotating cylinder of suitable diameter. Another embodiment of the test method applied to an entire sheet is to rotate within a plane the entire sheet at a sufficient rate as to provide the required linear speed between the test head and the portion of the magnetic medium below the test head.

The processing steps described up to this point, being performed on the sheet of material, are performed more efficiently relative to performing the same steps on individual disks, because it avoids much of the processing time that is taken up in the loading and unloading of individual disks in preparation for these steps. There will also be economies of scale during the processes of cleaning, sputtering, lubing, buffing, burnishing, and testing the media.

The sheet is further processed by removing individual disks from the sheet. Disks are removed from areas of the sheets which have sufficient thickness of sputtered magnetic material, and which have been processed by the steps described above. The method of removing individual disks will be adapted to the type of substrate material used for the sheet. For example, plastic substrate materials can be used with a die-cut process to cut out individual disks. Glassy substrate materials can be used if the individual disks are scored and broken out. Metal substrate sheets can be used if the individual disks are cut out with a device like a laser cutting tool.

A unique byproduct of processing the disk material as a sheet is that if media of various sizes were required to have the same thickness of material layers, a sheet could be formed with the requisite material layer thicknesses, and then the desired disk sized could all be cut from the same sheet. For instance, this might be used if there was a need to produce different size disks for different size disk drives, but with all having the same composition of material layers. FIG. 5 shows one example of this aspect of the present invention. One skilled in the art will readily recognize that multiple sizes and alternate arrangements of disks cut from the sheet are possible.

After the individual disks are removed from the sheet, the portion of the sheet not incorporated into disks is discarded, and the individual disks are then processed through the remaining steps required to manufacture a disk suitable for use as a sputtered magnetic storage media in a disk drive. These steps include edge finishing, which will attempt to correct for any damage to the disk caused by removing it from the sheet, and mounting the disk into a suitable carrier for further processing.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application may disclose several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Where the term "plurality" is used, that term shall be construed to include the quantity of one, unless otherwise stated. The entire disclosure of the patents and publications referred in this application are hereby incorporated herein by reference. Finally, the implementations described above and other implementations are within the scope of the following claims.

The invention claimed is:

1. A method of manufacturing a plurality of rigid sputtered magnetic media disks of one or more predetermined sizes from a rigid sheet, comprising the steps of:
providing a sheet of substrate material, wherein the sheet has a larger surface area than the predetermined size of a single disk and has a shape suitable to encompass at least a single disk;
polishing the sheet;
cleaning the polished sheet;
sputtering magnetic media to a predetermined depth over at least a portion of the cleaned sheet, wherein the portion of the sheet having the predetermined depth of magnetic media has a larger surface area than the predetermined size of a single disk and has a shape suitable to encompass at least a single disk;
lubricating the sputtered sheet;
cutting a plurality of individual rigid sputtered magnetic media disks from the sheet.

2. The method of claim 1, further comprising the step of buffing at least a predetermined portion of the sputtered sheet, before the sheet is lubricated, wherein the portion of the sputtered sheet being buffed has a larger surface area than the predetermined size of a single disk and has a shape suitable to encompass at least a single disk.

3. The method of claim 2, further comprising the step of burnishing at least a predetermined portion of the buffed sheet, before the sheet is lubricated, wherein the portion of the buffed sheet being burnished has a larger surface area than the predetermined size of a single disk and has a shape suitable to encompass at least a single disk.

4. The method of step 1, wherein the step of cutting comprises using a diecut process on at least a portion of the plurality of disks.

5. The method of step 1, wherein the step of cutting comprises scoring the perimeter of at least a portion of the plurality of disks, and breaking the scored disks from the sheet.

6. The method of step 1, wherein the step of cutting comprises using a laser to cut at least a portion of the plurality of disks from the sheet.

7. The method of step 1, wherein the step of cutting comprises using a water jet to cut at least a portion of the plurality of disks from the sheet.

8. The method of step 1, wherein the step of lubricating the sheet comprises the steps of applying lubricant; and removing excess lubricant by wiping.

9. The method of step 1, wherein the step of lubricating the sheet comprises the steps of applying lubricant; and removing excess lubricant by draining the excess lubricant by gravity.

10. The method of step 1, wherein the step of lubricating the sheet comprises the steps of applying lubricant; and removing excess lubricant by applying gas pressure.

11. The method of step 1, wherein the step of lubricating the sheet comprises the steps of applying lubricant; and removing excess lubricant by moving the sheet, thereby causing inertial forces to remove the excess lubricant.

12. The method of step 1, comprising the further step of testing the lubricated sheet for magnetic disparities.

13. The method of step 1, comprising the further step of testing the lubricated sheet for dropout voids.

14. The method of claim 2, wherein the step of buffing further comprises lubricating the sheet an initial time, bonding the lubrication to the lubricated sheet, and removing asperities.

15. A method of manufacturing a plurality of rigid sputtered magnetic media disks of one or more predetermined sizes from a rigid sheet, comprising:
polishing a rigid sheet of substrate material, wherein the rigid sheet has a larger surface area than the predetermined size of at least two disks and has a shape suitable to encompass the at least two disks;
cleaning the polished rigid sheet;
sputtering magnetic media to a predetermined depth over at least a portion of the cleaned rigid sheet, wherein the portion of the sheet having the predetermined depth of magnetic media has a larger surface area than the predetermined size of a single disk and has a shape suitable to encompass the at least two disks;
lubricating the sputtered rigid sheet;

magnetically testing the rigid sheet of substrate material; and cutting a plurality of individual rigid sputtered magnetic media disks from the magnetically tested rigid sheet of substrate material.

16. The method of claim 15, wherein the at least two disks have different surface areas.

17. The method of claim 15, wherein the step of polishing the rigid sheet is carried out by using a first type of rolling mechanism to move the rigid sheet at a predetermined speed and using a second type of rolling mechanism to perform the polishing.

18. The method of claim 15, wherein the method of manufacturing further comprises moving the rigid sheet of substrate material from the sputtering step to the lubricating step using a first type of rolling mechanism.

19. The method of claim 18, wherein the first type of rolling mechanism is capable of moving the rigid sheet of substrate material in a first direction and is also capable of moving the rigid sheet in a second direction opposite the first direction.

20. The method of claim 15, wherein the substrate material is non-magnetic.

* * * * *